(12) United States Patent
Galler et al.

(10) Patent No.: US 7,552,361 B2
(45) Date of Patent: Jun. 23, 2009

(54) SOFTWARE TESTING OPTIMIZATION APPARATUS AND METHOD

(75) Inventors: Glenn Norman Galler, San Jose, CA (US); Mark Jen, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 11/610,944

(22) Filed: Dec. 14, 2006

(65) Prior Publication Data

US 2008/0148247 A1 Jun. 19, 2008

(51) Int. Cl.
*G06F 11/00* (2006.01)
(52) U.S. Cl. ..................................... 714/38
(58) Field of Classification Search .............. 714/26, 714/37–39, 45, 46
See application file for complete search history.

(56) References Cited

U.S. PATENT DOCUMENTS

| | | | | |
|---|---|---|---|---|
| 5,673,387 | A | 9/1997 | Chen et al. ............. | 395/183.14 |
| 5,724,504 | A | 3/1998 | Aharon et al. ......... | 395/183.09 |
| 5,754,860 | A | 5/1998 | McKeeman et al. ...... | 395/704 |
| 5,805,795 | A | 9/1998 | Whitten ................ | 395/183.14 |
| 6,038,686 | A | 3/2000 | Rana ..................... | 714/29 |
| 6,298,317 | B1 | 10/2001 | Wiemann ................ | 703/22 |
| 6,536,036 | B1 | 3/2003 | Pavela ................... | 717/125 |
| 6,745,383 | B1 | 6/2004 | Agarwal et al. ........ | 717/132 |
| 6,748,584 | B1 | 6/2004 | Witchel et al. ......... | 717/136 |
| 6,959,431 | B1 | 10/2005 | Shiels et al. ........... | 717/124 |
| 6,978,401 | B2 * | 12/2005 | Avvari et al. ........... | 714/38 |
| 7,089,534 | B2 * | 8/2006 | Hartman et al. ........ | 717/125 |
| 7,134,113 | B2 * | 11/2006 | Williams ............... | 717/106 |
| 7,392,148 | B2 * | 6/2008 | Basham et al. .......... | 702/122 |
| 2003/0046613 | A1 * | 3/2003 | Farchi et al. ........... | 714/38 |
| 2003/0093716 | A1 * | 5/2003 | Farchi et al. ........... | 714/34 |
| 2005/0223357 | A1 * | 10/2005 | Banerjee et al. ....... | 717/120 |
| 2005/0223361 | A1 * | 10/2005 | Belbute ................. | 717/124 |
| 2005/0243736 | A1 | 11/2005 | Faloutsos et al. ...... | 370/254 |
| 2006/0010426 | A1 * | 1/2006 | Lewis et al. ............ | 717/124 |

OTHER PUBLICATIONS

"Passing the Test: Magellan Improves Your Code" Microsoft Research News & Highlights, Sheahan, P.; 2006 http://research.microsoft.com/displayarticle.aspx?id=707.
"The Future of Code-Coverage Tools" Haghighat, M.R. et al, StickyMinds.com; 2006 http://www.stickyminds.com/sitewide.asp?ObjectId=7580&Function=DETAILBROWSE&ObjectType=ART&sqry=%2AZ%28SM%29%2AJ%28MIXED%29%2AR%28relevance%29%2AK%28simplesite%29%2AF%28the+future+of+code%2Dcoverage+toos%29%2A&sidx=0&sopp=10&sitewide.asp?sid=1&sqry=%2AZ%28SM%29%2AJ%28MIXED%29%2AR%28relevance%29%2AK%28simplesite%29%2AF%28the+future+of+code%2Dcoverage+toos%29%2A&sidx=0&sopp=10.

* cited by examiner

*Primary Examiner*—Nadeem Iqbal
(74) *Attorney, Agent, or Firm*—Kunzler & McKenzie

(57) ABSTRACT

A method to optimize software testing is disclosed. The method includes generating a set of software testcases for testing a software product, creating a testcase coverage matrix comprising testcase identifiers corresponding to the set of testcases and source code line identifiers corresponding to the lines of source code tested thereby, selecting all testcases that uniquely test a line of source code, marking all source code line identifiers covered by the selected testcases, prioritize the testcases of testcase identifiers associated with unmarked source code identifiers, and selecting one or more testcases of testcase identifiers that corresponds to each unmarked source code identifier to determine an optimal set of testcases for software testing.

8 Claims, 7 Drawing Sheets

300a

| 310 → 330 → | Testcase A 330a | Testcase B 330b | Testcase C 330c | Testcase D 330d |
|---|---|---|---|---|
| Line I 310a | Hit 340aa | | Hit 340ac | Hit 340ad |
| Line II 310b | | Hit 340bb | Hit 340bc | |
| Line III 310c | | | Hit 340cc | Hit 340cd |
| Line IV 310d | Hit 340da | | | |
| Line V 310e | | | | |
| Line VI 310f | | Hit 340fb | | |
| Line VII 310g | | Hit 340gb | Hit 340gc | Hit 340gd |
| Line VIII 310h | Hit 340ha | | | Hit 340hd |

|  | Testcase A 330a | Testcase B 330b | Testcase C 330c | Testcase D 330d |
|---|---|---|---|---|
| Line I 310a | Hit 340aa |  | Hit 340ac | Hit 340ad |
| Line II 310b |  | Hit 340bb | Hit 340bc |  |
| Line III 310c |  |  | Hit 340cc | Hit 340cd |
| Line IV 310d | Unique Hit 340da |  |  |  |
| Line V 310e |  |  |  |  |
| Line VI 310f |  | Unique Hit 340fb |  |  |
| Line VII 310g |  | Hit 340gb | Hit 340gc | Hit 340gd |
| Line VIII 310h | Hit 340ha |  |  | Hit 340hd |

| | Testcase A 330a | Testcase B 330b | Testcase C 330c | Testcase D 330d |
|---|---|---|---|---|
| Line I 310a | ✓ Hit 340aa | | Hit 340ac | Hit 340ad |
| Line II 310b | | ✓ Hit 340bb | Hit 340bc | |
| Line III 310c | | | Hit 340cc | Hit 340cd |
| Line IV 310d | ✓ Unique Hit 340da | | | |
| Line V 310e | | | | |
| Line VI 310f | | ✓ Unique Hit 340fb | | |
| Line VII 310g | | ✓ Hit 340gb | Hit 340gc | Hit 340gd |
| Line VIII 310h | ✓ Hit 340ha | | | Hit 340hd |

| | Testcase A 330a | Testcase B 330b | Testcase C 330c | Testcase D 330d |
|---|---|---|---|---|
| Line I 310a | ✓ Hit 340aa | | X Hit 340ac | X Hit 340ad |
| Line II 310b | | ✓ Hit 340bb | X Hit 340bc | |
| Line III 310c | | | Hit 340cc | Hit 340cd |
| Line IV 310d | ✓ Unique Hit 340da | | | |
| Line V 310e | | | | |
| Line VI 310f | | ✓ Unique Hit 340fb | | |
| Line VII 310g | | ✓ Hit 340gb | X Hit 340gc | X Hit 340gd |
| Line VIII 210h | ✓ Hit 340ha | | | X Hit 340hd |

| 310 ↓  330 → | Testcase A 330a | Testcase B 330b | Testcase C 330c | Testcase D 330d |
|---|---|---|---|---|
| Line I 310a | ✓ Hit 340aa | | X Hit 340ac | X Hit 340ad |
| Line II 310b | | ✓ Hit 340bb | X Hit 340bc | |
| Line III 310c | | | ✓ Hit 340cc | X Hit 340cd |
| Line IV 310d | ✓ Unique Hit 340da | | | |
| Line V 310e | | | | |
| Line VI 310f | | ✓ Unique Hit 340fb | | |
| Line VII 310g | | ✓ Hit 340gb | X Hit 340gc | X Hit 340gd |
| Line VIII 310h | ✓ Hit 340ha | | | X Hit 340hd |

FIG. 3E

SOFTWARE TESTING OPTIMIZATION APPARATUS AND METHOD

BACKGROUND OF THE INVENTION

1. Field of the Invention

This invention relates to methods to test software and more particularly relates to methods to optimize software testing.

2. Description of the Related Art

Software testing is a critical phase in software development cycle. Through software testing, engineers are able to identify problems that need correction before a software product is released, implemented, or updated. A testing phase often includes testing multiple scenarios referred to as testcases that involve certain lines of the software code. The testcases are run and analyzed to identify whether the software code is operating as intended. Though testing software in this manner is effective to test software, there exist certain problems.

For example, a software testing phase may include thousands of testcases and millions of lines of code. Running and analyzing each testcase can take considerable time given the shear volume of testcases and code. This problem is often compounded as a software development cycle may include multiple software testing phases. Lengthy software testing phases decrease efficiency, increase costs, and reduce the overall benefit of the software development cycle.

From the foregoing discussion, applicant asserts that a need exists for a method that optimizes software testing. Beneficially, such a method would increase software testing efficiency by excluding unnecessary or otherwise unwanted testcases from a software testing phase.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 3A-3E are text diagrams illustrating testcase matrices that collectively illustrate one of many approaches to optimizing software testing in accordance with the present invention.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code lines, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
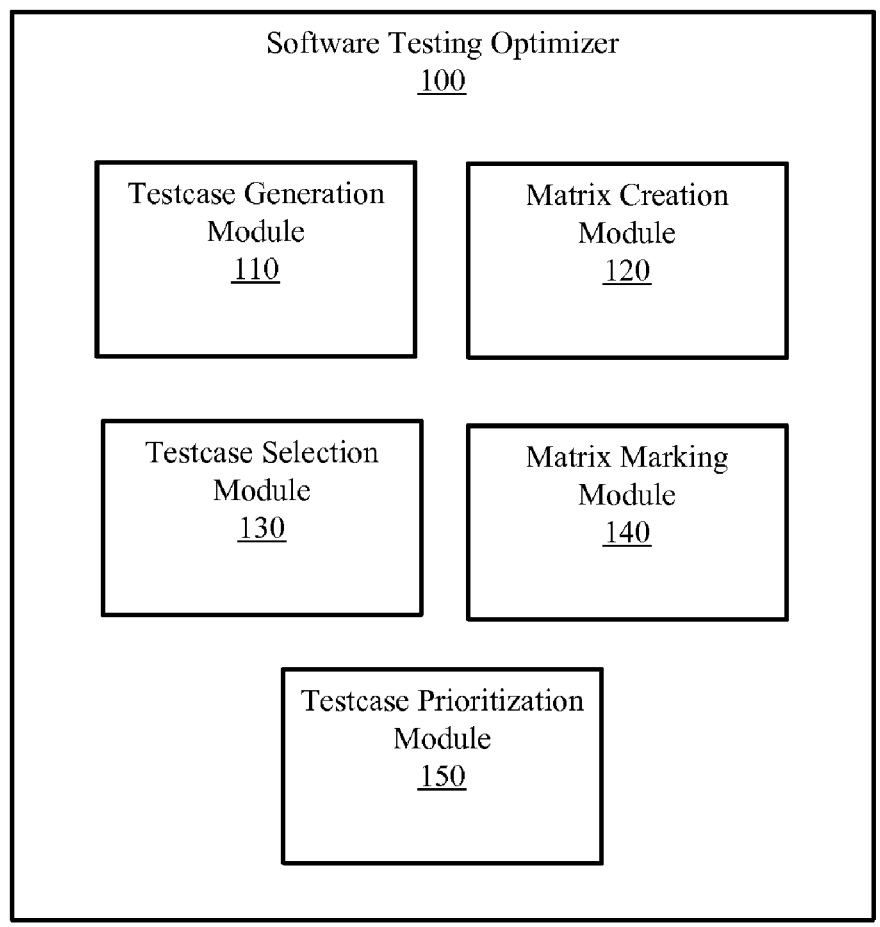
FIG. 1 is a block diagram illustrating one embodiment of a software testing optimizer in accordance with the present invention.

FIG. 1 is a block diagram illustrating one embodiment of a software testing optimizer 100 in accordance with the present invention. The depicted software testing optimizer 100 includes a testcase generation module 110, a matrix creation module 120, a testcase selection module 130, a matrix marking module 140, and a testcase prioritization module 150. The various modules of the software testing optimizer 100 cooperate to optimize software testing by determining unnecessary testcases via the creation and analysis of a testcase coverage matrix.

The testcase generation module 110 generates a set of testcases that test one or more lines of source code of a software product. The matrix creation module 120 creates a testcase coverage matrix that represents the set of testcases and each line of source code tested thereby. The testcase coverage matrix may include a testcase identifier for each software testcase and a code line identifier for each line of source code. In certain embodiments, the testcase coverage matrix also includes status indicators that indicate whether a particular software testcase covers or tests a particular line of source code. A testcase coverage matrix provides an organized layout of the relationship between each testcase and each line of source code from which the set of testcases may be systematically analyzed.

The testcase selection module 130 selects all the testcases of testcase identifiers that uniquely correspond to one or more source code line identifiers. Selecting testcases of such testcase identifiers is an efficient way of determining which testcases must be included in the software testing phase in order to cover all relevant lines of source code. The matrix marking module 140 marks all the source code line identifiers that correspond to the testcase identifiers of selected testcases. As depicted in FIG. 3D, marking code line identifiers may include marking the status indicators associated with each code line identifier. Marking all the code line identifiers accordingly facilitates determining which lines of source code are not covered by the previously selected testcases.

The testcase prioritization module 150 prioritizes the testcases of testcase identifiers corresponding to the unmarked source code line identifiers according to selected criteria. Depending upon the embodiment, the criteria may include expected duration of execution, number of source code lines tested thereby, and more. Prioritizing testcases facilitates determining which testcases are more desirable to include in the software testing phase.

The testcase selection module 130 may select amongst the prioritized testcases to determine an optimal set of testcases for testing the source code. An optimal set of testcases may correspond to all the testcase identifiers selected by the testcase selection module (i.e. all testcases selected as uniquely corresponding to one or more lines of source code and any testcase selected upon prioritization of the testcases). Accordingly, the software testing optimizer 100 optimizes software testing by determining unnecessary testcases via creation and analysis of a testcase coverage matrix.

The schematic flow chart diagram that follows is generally set forth as logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
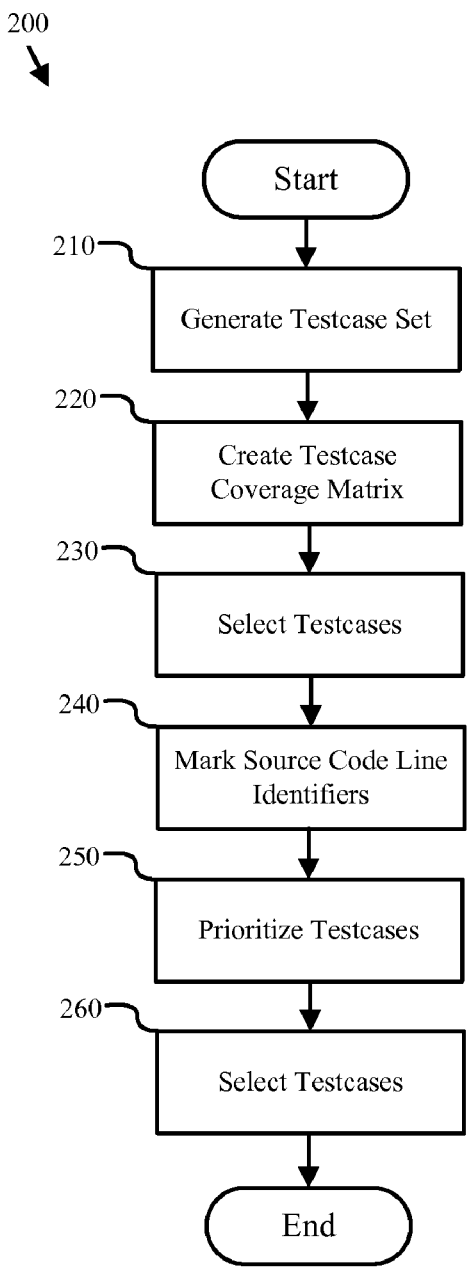
FIG. 2 is a schematic flow chart diagram illustrating one embodiment of a software testing optimization method in accordance with the present invention.

FIG. 2 is a schematic flow chart diagram illustrating one embodiment of a software optimization method 200 of the present invention. The method 200 depicted in FIG. 2 substantially includes the steps to carry out the functions presented above with respect to the operation of the described software testing optimizer of FIG. 1. In one embodiment, the method 200 is implemented with a computer program product comprising a computer readable medium having a computer readable program. The software testing optimizer 100 may execute the computer readable program.

The method begins and the testcase generation module 110 generates 210 a set of software testcases that each tests one or more lines of source code of a software product. One skilled in the art will recognize that generating 210 a set of testcases may be part of a testing phase of a software development cycle. The matrix creation module 120 creates 220 a testcase coverage matrix corresponding to the set of testcases generated. As exemplified in the description of FIGS. 3A-3E, the testcase coverage matrix includes testcase identifiers that represent the software testcases, and source code line identifiers that represent lines of source code tested by the software testcases.

The testcase selection module 130 selects 230 all the testcases of testcase identifiers that uniquely correspond to a particular source code line identifier. In certain embodiments, no testcase identifiers will uniquely correspond to any source code line identifiers, and consequently no testcases will be selected by the select testcases step 230. Failing to select any testcase identifiers does not frustrate the method 200, however, as an optimal set of testcases will still be determined by the steps that follow.

The code identifier marking module 140 marks 240 the source code line identifiers that correspond to any testcase indicators of testcases selected in the foregoing testcase selection step 230. If no testcases are selected in the step 230, then no source code line indicators will be marked by step 240. Consequently, upon completion, each source code line identifier is either marked or unmarked. The testcase prioritization module 150 then prioritizes 250 the testcases of testcase identifiers that correspond to unmarked source code line identifiers according to selected criteria.

The selection module 150 selects 260 amongst the prioritized testcases to determine an optimal set of testcases for testing the software product. In certain embodiments, the optimal set of testcases will include those testcases that uniquely test particular lines of source code and those testcases of the highest priority. In some embodiments, the optimal set of testcases includes the minimum number of testcases required to provide complete coverage of all lines of source code corresponding to the set of testcases initially generated.

FIGS. 3A-3E are text diagrams illustrating testcase coverage matrices 300 matrices that collectively illustrate one of many approaches to optimizing software testing in accordance with the present invention. The testcase coverage matrix 300a of FIG. 3A includes a row of testcase indicators 330, a column of source code line indicators 310, and a plurality of testcase status indicators 340. The testcase identifiers 330 each represent a software testcase of a set of software testcases, the source code line identifiers 340 each represent one or more lines of source code, and the status indicators 340 each represent the lines of source code (represented by a line indicator 310) that are tested by each software testcase (represented by a testcase indicator 330).

For example, the matrix 300a indicates that the testcase represented by testcase A (330a) tests the lines of source code represented by line I (310a), line IV (340d), and line VIII (410h). Similarly, the matrix 300a indicates the lines of source code that are tested by each of the remaining testcases. It should be noted that line V (310e) is not tested by any testcase, illustrating that not every line of source coded represented in the matrix 300a needs to be tested by a software testcase, but may be included therein for completeness.

In some embodiments, source code line indicators are subdivided within the testcase coverage matrix into software modules. For example, source code lines I-III could correspond to a first software module, source code lines IV-VI could correspond to a second software module, and source code lines VII and VIII could correspond to a third software module. Organizing software lines into module may further facilitate ascertaining the appropriate set of testcases for optimizing software testing by indicating which line of software corresponds to which part of a software product.

Once the testcase coverage matrix 300a is created, the first step in ascertaining an optimal set of testcases may include determining which, if any, testcases identifiers 330 uniquely correspond to one or more source code line identifiers 310. As illustrated in FIG. 2B, testcase A (330a) and testcase B (330b) both correspond to source code line identifiers 340 to which no other testcase corresponds. More specifically, testcase A (330a) is the only testcase identifier that includes a "Hit status" for line IV (310d), and testcase B (330b) is the only testcase identifier that includes a "Hit status" for line VI (310f). For illustration purposes, the status indicator 340da that corresponds to testcase A (330a) at line IV (310d) is labeled as a "Unique Hit" and the status indicator 240fbb of testcase B (330b) at line VI (340f) is similarly labeled. Accordingly, the software testcases represented by the testcase identifiers testcase A (330a) and testcase B (330b) must be included as the set of testcases that will ultimately be tested.

Referring to FIG. 3C, now that the testcase identifiers 330 that uniquely correspond to source code identifiers 310 (testcase A (330a) and testcase B (330b)) have been identified, the other source code line indicators 310 of these testcases identifiers will be covered by executing the software testcases corresponding to testcase A (330a) and testcase B (330b). Accordingly, for illustration purposes, all the status indicators corresponding to testcase A (330a) and testcase B (330b) include a checkmark symbol signifying their inclusion into the software testing phase.

Referring to FIG. 3D, now that the all the lines of testcase A (330a) and testcase B (330b) are marked as covered, redundant status indicators may be shown as unnecessary for testing by an annotation "X". Accordingly, the status indicators 340ac, 340bc, 340gc, 340ad, 340gd, and 340hd are so marked. One skilled in the art will recognize that marking status indicators in the foregoing manner is one of many ways to mark source code line identifiers that correspond to testcase identifiers of selected testcases. Marking status indicators 340 illustrates that both testcase C (330c) and testcase D (330d) include line III (310c) that has not yet been addressed.

Because line III (310c) is only covered by testcases C (330c) and D (330d), the two testcases corresponding to testcase C (330c) and D (330d) are prioritized according to selected criteria. In certain embodiments, the criteria may include expected duration of execution, such that the testcases with lengthier execution times may be excluded from the testing phase. Another criterion may include evaluating how effectively a testcase covers one or more lines of code. In some embodiments, the criteria used could include several criterions such as weighing line coverage against execution duration. Accordingly, the present invention is not limited by the type of criteria used, but rather the use of a criterion or criteria to prioritize testcases that do not uniquely correspond to lines of source code to determine the optimal set of testcases.

Referring now to FIG. 3E, as illustrated, testcase C (330c) and testcase D (330d) each cover a total of four lines. As such, the testcases represented by testcases C (330c) and D (330d) share an equal amount of source code line coverage and are not distinguished according such a criterion. For purposes of this illustration, it is assumed that the testcase of testcase C (330c) has an estimated execution time that is less than that of testcase D (330d). Accordingly, the testcase represented by testcase C (330c), as opposed to the testcase of testcase D (330d), will be selected as part of the software testing phase, thereby reducing the time required to test the software yet still providing complete coverage.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product to optimize software testing by detecting and determining unnecessary test cases within a testcase coverage matrix comprising a computer useable storage medium including a computer readable program, wherein the computer program product when executed on a computer causes the computer to:
   generate a set of software testcases for testing a software product, each software testcase thereof configured to test at least one line of source code of the software product;
   create a testcase coverage matrix comprising testcase identifiers and source code line identifiers, each testcase identifier thereof associated with a software testcase of the set of software testcases, the software testcase configured to test the logic of an associated line of source code, and each source code line identifier thereof associated with a line of source code;
   select all software testcases associated with testcase identifiers of the testcase coverage matrix that uniquely correspond to a source code line identifier;
   mark source code line identifiers of the testcase coverage matrix that correspond to testcase identifiers of the selected software testcases;
   prioritize the software testcases associated with testcase identifiers corresponding to unmarked source code line identifiers according to selected criteria, the unmarked code line identifiers corresponding to two or more testcase identifiers; and
   select at least one software testcase associated with a testcase identifier that corresponds to at least one unmarked source code line identifier, the at least one testcase having a highest priority, to determine an optimal set of testcases for software testing.

2. The computer program product of claim 1, wherein the computer readable program is further configured to cause the computer to organize the source code line identifiers within the testcase coverage matrix according to software modules.

3. The computer program product of claim 1, wherein the testcase coverage matrix further comprises a plurality of status indicators configured to indicate whether a particular software testcase covers a particular line of source code.

4. The computer program product of claim 1, wherein the optimal set of testcases comprises a minimum number of testcases required to provide complete coverage of the lines of source code tested by the set of testcases.

5. The computer program product of claim 1, wherein the selected criteria comprise an expected duration of execution and how effectively a testcase covers one or more lines of source code.

6. An apparatus to optimize software testing by detecting and determining unnecessary test cases within a testcase coverage matrix, the apparatus comprising:
   a testcase generation module configured to generate a set of software testcases for testing a software product, each software testcase thereof configured to test at least one line of source code of the software product;
   a matrix creation module configured to create a testcase coverage matrix comprising testcase identifiers and source code line identifiers, each testcase identifier thereof associated with a software testcase of the set of software testcases, the software testcase configured to test the logic of an associated line of source code, and each source code line identifier thereof associated with a line of source code;

a testcase identifier selection module configured to select all software testcases associated with testcase identifiers of the testcase coverage matrix that uniquely correspond to a source code line identifier;

a code identifier marking module configured to mark source code line identifiers of the testcase coverage matrix that correspond to testcase identifiers of the selected software testcases; and a testcase prioritization module configured to prioritize the software testcases associated with testcase identifiers corresponding to unmarked source code line identifiers according to selected criteria, the unmarked code line identifiers corresponding to two or more testcase identifiers;

the testcase selection module further configured to select at least one software testcase associated with a testcase identifier that corresponds to at least one unmarked source code line identifier, the at least one testcase having a highest priority, to determine an optimal set of testcases for software testing.

7. The apparatus of claim 6, wherein the optimal set of testcases comprises a minimum number of testcases required to provide complete coverage of the lines of source code tested by the set of testcases.

8. The apparatus of claim 6, wherein the selected criteria comprise an expected duration of execution and how effectively a testcase covers one or more lines of source code.

* * * * *